Patented May 6, 1947

2,420,143

UNITED STATES PATENT OFFICE 2,420,143

PROCESS FOR THE MANUFACTURE OF A POLYCYCLIC HYDROCARBON

William J. Mattox, La Grange, Ill., assignor to Universal Oil Products Company, Chicago, Ill., a corporation of Delaware No Drawing. Application October 31, 1944,
Serial No. 561,318

13 Claims. (Cl. 260—668)

This invention relates to the manufacture of naphthalene and phenanthrene and is more particularly concerned with the catalytic conversion of secondary butyl benzenes to these compounds.

Naphthalene has the formula $C_{10}H_8$, a melting point of 80° C., a boiling point of 218° C. and is commonly obtained in a limited amount by crystallization from coal tar fractions. At the present time it is used as a base for dye manufacture, picric acid, various phthalic acids and the hydrogenated compounds tetralin and decalin, corresponding to partial and complete hydrogenation. Similarly, there is a demand for such compounds as phenanthrene and anthracene as intermediate compounds for the manufacture of various dyes, explosives, pharmaceutical products and miscellaneous chemicals. Although these compounds are now used in various industries, the quantities consumed are relatively small. Further development of new uses for these compounds has been hampered by the limited supply which discouraged research to discover new methods of utilizing the compounds in organic synthesis. It is an object of the present invention to provide a method of greatly increasing the available quantities of these materials so that their use can be extended in various fields.

In one embodiment the present invention comprises the manufacture of polycyclic compounds by subjecting a secondary butyl benzene at dehydrogenating conditions to contact with a dehydrogenation catalyst.

The following structural equations are given to indicate the reactions which occur, although no suggestions are given as to the intermediate stages.

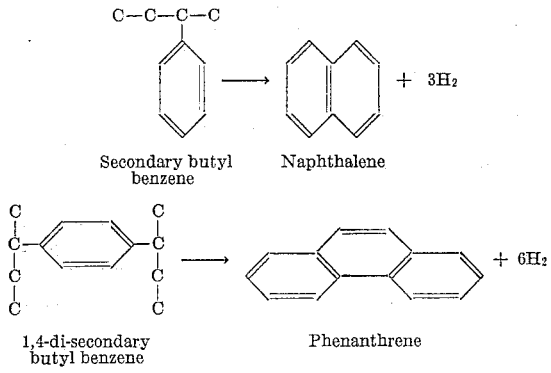

From a study of the above structural formulas of the secondary butyl benzenes it does not appear likely that these molecules could be converted to naphthalene and phenanthrene. However, I have found that when using suitable catalysts and conditions of operation, the molecules of secondary butyl benzenes undergo molecular rearrangement along with dehydrogenation and cyclization to produce commercially practical yields of naphthalene and phenanthrene. The exact nature and sequence of the reactions is not known but as shown in the example presented hereinafter in this specification, an appreciable quantity of the secondary butyl benzenes undergo these conversion reactions to produce the desired results.

The preferred catalyst for accelerating the reactions in the directions indicated consist in general of relatively inert and refractory supports containing compounds and preferably the oxides of the elements in the left-hand columns of groups V and VI of the periodic table. These elements are listed below for purposes of record.

Group V:
Vanadium
Columbium
Tantanium
Group VI:
Chromium
Molybdenum
Tungsten
Uranium The carriers which may be employed comprise a large number of supports which are structurally stable under conditions of service and reactivation. Suitable materials include oxides of aluminum, particularly an oxide of aluminum having the physical characteristics of Activated Alumina of commerce, magnesium, thorium, zinc, titanium and similar materials. Siliceous carriers comprise fuller's earth, various clays such as montmorillonite or bentonite, either raw or acid treated. Various forms of silica and natural or artificial silicates may also be used.

Catalysts may be prepared by impregnating the granular support with a solution of a salt of a volatile acid which is then dehydrated and calcined to leave an oxide residue or the hydroxides may be precipitated onto the granules by suspending them in solutions of the salt and adding alkaline precipitants, after which the suspended material consisting of refractory supports and precipitated hydroxide is again dehydrated and calcined to leave a residue of catalytic oxide on the surface and in the pores of the support. Another method of manufacture which may be employed to produce a satisfactory catalyst, particularly one comprising the composite of aluminum oxide and either chromium oxide or molybdenum oxide, consists of precipitating a hydrated aluminum oxide in the presence of a soluble compound of either chromium or molybdenum, followed by evaporating the solution to dryness and calcining the residue, to form the catalyst composite. Still another method comprises forming a gelatinous precipitate of aluminum oxide in a solution of a soluble compound of chromium or molybdenum to sorb or occlude a minor quantity of these materials in the gelatinous precipitate, followed by filtering and heating to produce the final composite catalyst. The manufacture of catalyst for use in the present invention is not limited to any particular method of adding the catalytic compounds to the supports and any method suited to the reactions of the particular compound chosen may be employed. If desired, a powdered and refractory support may be impregnated with a suitable compound and the composite formed into particles by extrusion or pelleting methods before or after calculation.

Not all of the compounds or, more particularly, the oxides of the preferred catalytic elements have the same or equivalent catalytic value in accelerating the reactions involved in the invention and when different oxides or different supports are used, optimum conditions for the production of maximum yields of the desired compounds will vary.

As previously set forth, this invention is directed to the conversion of secondary butyl benzenes to naphthalene or phenanthrene. However, alkyl derivatives of these compounds may be produced by employing as a charging stock secondary butyl benzenes having additional alkyl groups such as methyl, ethyl, propyl in the benzene ring. The term "secondary butyl benzenes" as used in this specification and appended claims is meant to include secondary butyl benzene and secondary butyl benzenes having other alkyl groups in the benzene ring.

The actual operation of the process is relatively simple and may consist of passing the secondary butyl benzenes or derivatives of secondary butyl benzene through a fixed bed or beds of selected dehydrogenation catalyst contained in a confined zone which may be either a chamber type or tubular type and the products separated by fractionation or chemical methods as may be found most expedient. Unconverted materials may be recycled to increase the efficiency of the process and produce high ultimate yields of the desired product. Other methods of operation may be employed such as, for example, a fluid operation wherein the heated charge is passed through a bed of finely divided catalyst at a rate such that the catalyst is maintained in a fluidized condition, the products removed, separated, and the unconverted material recycled to the reaction zone. Still another method may comprise passing a moving compact bed of catalyst through a reaction zone in countercurrent relationship to the incoming hydrocarbon reactants, followed by the usual separation and recycling steps.

The temperatures most favorable to the desired reactions fall within the approximate range of 450 to 700° C. and the pressures which may be employed fall within the range of from about atmospheric to about 1000 pounds per square inch and preferably below about 500 pounds per square inch.

Hydrogen or hydrogen-containing gases may also be added or recirculated to the reaction zone to decrease the carbon deposition on the catalyst.

After an extended period of conversion the catalyst becomes contaminated by the deposition of carbonaceous materials and can be reactivated by the removal of these carbonaceous materials, preferably by combustion by contacting the contaminated catalyst with oxygen or oxygen-containing gases.

The following example is introduced to further illustrate the character of the invention, although not for the purpose of unduly limiting its proper scope.

*Example*

Secondary butyl benzene was passed at atmospheric pressure and an hourly liquid space velocity of 1 over an 8 weight per cent chromium oxide, 92 weight per cent aluminum oxide catalyst maintained at a temperature of 550° C. The total liquid recovery amounted to 83 weight per cent of the secondary butyl benzene charge and contained 35 weight per cent of naphthalene. The naphthalene yield was about 29 weight per cent per pass. Most of the remaining product was unreacted secondary butyl benzene.

I claim as my invention:

1. A process for the manufacture of a polycyclic hydrocarbon which comprises subjecting a secondary butyl benzene to the action of a dehydrocyclization catalyst, comprising a compound of an element selected from the left-hand columns of groups V and VI of the periodic table, under dehydrocyclization conditions.

2. A process for the manufacture of a polycyclic hydrocarbon which comprises subjecting a secondary butyl benzene under dehydrocyclization conditions to the action of a catalyst comprising a relatively inert supporting material and a compound of an element selected from the left-hand columns of groups V and VI of the periodic table.

3. A process for the manufacture of a polycyclic hydrocarbon which comprises subjecting a secondary butyl benzene under dehydrocyclization conditions to the action of a catalyst comprising a relatively inert supporting material and an oxide of at least one element selected from the left-hand columns of groups V and VI of the periodic table.

4. A process for the manufacture of naphthalene which comprises subjecting secondary butyl benzene to the action of a dehydrocyclization catalyst, comprising an oxide of an element selected from the left-hand columns of groups V and VI of the periodic table, under dehydrocyclization conditions.

5. A process for the manufacture of phenanthrene which comprises subjecting 1,4-di-secondary butyl benzene to the action of a dehydrocyclization catalyst, comprising an oxide of an element selected from the left-hand columns of groups V and VI of the periodic table, under dehydrocyclization conditions.

6. A process for the manufacture of alkyl derivatives of naphthalene which comprises subjecting an alkyl-substituted secondary butyl benzene to the action of a dehydrocyclization catalyst, comprising an oxide of an element selected from the left-hand columns of groups V and VI of the periodic table, under dehydrocyclization conditions.

7. A process for the manufacture of polycyclic hydrocarbons which comprises subjecting a secondary butyl benzene to the action of a dehydrocyclization catalyst, comprising a compound of an element selected from the left-hand columns of groups V and VI of the periodic table, under dehydrocyclization conditions in the presence of hydrogen.

8. A process for the manufacture of a polycyclic hydrocarbon which comprises subjecting a secondary butyl benzene under dehydrocyclization conditions to the action of a catalyst comprising a composite of aluminum oxide and an oxide of an element selected from the left-hand columns of groups V and VI of the periodic table.

9. A process for manufacturing naphthalene which comprises subjecting secondary butyl benzene to the action of a dehydrocyclization catalyst, comprising a compound of an element selected from the left-hand columns of groups V and VI of the periodic table, at a temperature within the range of about 450 to about 700° C. and under a pressure within the range of substantially atmospheric to about 1000 pounds per square inch.

10. The process of claim 9 further characterized in that said catalyst comprises an oxide of an element of group VI of the periodic table supported on aluminum oxide.

11. A process for the manufacture of polycyclic hydrocarbons which comprises introducing a secondary butyl benzene into a confined reaction zone, said reaction zone being maintained under dehydrocyclization conditions and containing therein a bed of dehydrocyclization catalyst comprising a compound of an element selected from the left-hand columns of groups V and VI of the periodic table, said catalyst being in fixed relationship to the incoming secondary butyl benzene and separating the polycyclic hydrocarbons from the reaction products.

12. A process for the manufacture of polycyclic hydrocarbons which comprises introducing the secondary butyl benzene into a confined reaction zone maintained under dehydrocyclization conditions and containing therein a finely divided dehydrocyclization catalyst comprising a compound of an element selected from the left-hand columns of groups V and VI of the periodic table, regulating the flow of said secondary butyl benzene to maintain said finely divided dehydrocyclization catalyst in a fluidized condition, withdrawing the reaction products from said confined reaction zone and separating therefrom the polycyclic hydrocarbons.

13. A process for the manufacture of a polycyclic hydrocarbon which comprises introducing a secondary butyl benzene to a confined reaction zone maintained under dehydrocyclization conditions and therein subjecting said secondary butyl benzene to the action of a finely divided dehydrocyclization catalyst comprising a compound of an element selected from the left-hand columns of groups V and VI of the periodic table, said catalyst being passed through said confined reaction zone in countercurrent flow arrangement to said secondary butyl benzene, withdrawing the reaction products of said confined reaction zone and separating therefrom polycyclic hydrocarbons.

WILLIAM J. MATTOX.

REFERENCES CITED

The following references are of record in the file of this patent:

UNITED STATES PATENTS

| Number | Name | Date |
|---|---|---|
| 2,182,313 | Dreisbach | Dec. 5, 1939 |
| 2,272,266 | Grosse et al. | Feb. 10, 1942 |